Oct. 8, 1968   J. M. BARRINGER   3,405,319
SERIES REGULATOR WITH DISABLING NETWORK
Filed Jan. 3, 1966
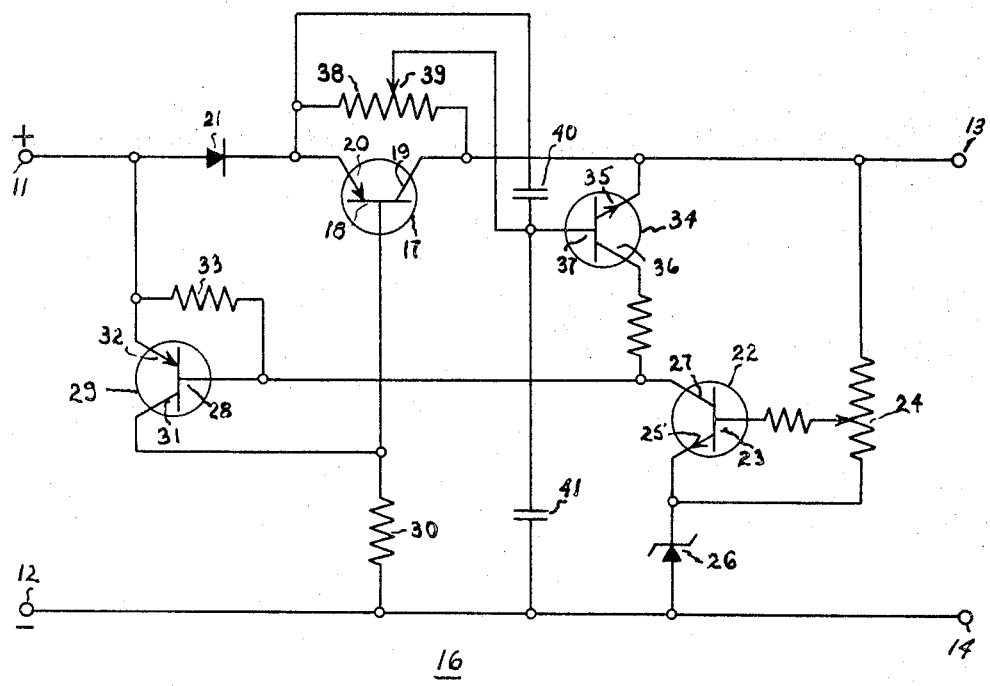
INVENTOR:
JERRY M. BARRINGER,
BY J. David Blumenfeld
HIS ATTORNEY.

United States Patent Office 3,405,319
Patented Oct. 8, 1968

3,405,319
SERIES REGULATOR WITH DISABLING
NETWORK
Jerry M. Barringer, Lynchburg, Va., assignor to General
Electric Company, a corporation of New York
Filed Jan. 3, 1966, Ser. No. 518,331
2 Claims. (Cl. 317—23)

ABSTRACT OF THE DISCLOSURE

A voltage regulator including a potentiometer connected across the collector-emitter path of the series-regulating transistor to sample the voltage drop across the path to disable the regulator whenever the dissipation across the collector-emitter of the series-regulating transistor exceeds a predetermined value. The voltage across the emitter-collector path is utilized to drive a normally non-conducting switching transistor into the conductive state whenever the voltage exceeds a predetermined level. When the switching transistor is driven into the conducting state, the output from the switching transistor biases the series-regulating transistor into the non-conducting state, thereby disabling the regulator and protecting the series transistor. When the abnormal condition ceases the regulator is restored to its operative state.

---

This invention relates to a regulating circuit which includes a protective network for disabling the regulator and protecting it from damage due to overload, short circuit, or excessive input voltage levels.

Regulators of the type utilizing the collector-emitter path of a transistor as a series regulating element are well known for producing and maintaining a constant output voltage or current in the face of varying input and load conditions. In regulator systems of this type, a sensing transistor is coupled to the output terminals to produce a control signal as a function of, let us say, the output voltage variations. This control signal is utilized to bias the series regulator transistors, either directly, or through the medium of a bias control transistor, to control the conductivity of the regulating transistor. The voltage drop across the collector-emitter path of the transistor is thus selectively varied to maintain the output voltage constant with fluctuation in load or in the input voltage. One example of such a voltage regulator arrangement is shown and described in U.S. Letters Patent 2,693,568, F. H. Chase, issued Nov. 2, 1954, and entitled "Current and Voltage Regulation."

While such voltage-regulating circuits have proved to be very useful and are widely used to provide a regulated output from an unregulated input supply source, they do have a serious limitation in that they are susceptible to damage or destruction in the event of a large increase in the input voltage, an overload condition, or a short-circuited output condition. Under any one of these conditions, the regulator attempts to compensate by producing increasingly larger voltage drops across the series regulating elements, and by drawing increasingly large currents. If the condition is serious enough and persists long enough, the series element may be damaged or destroyed by exceeding the rated collector-to-emitter voltage, or by destroying the transistor junctions through excessive heating. For example, in the event that a short-circuit condition occurs across the output, the voltage across the load or output drops to zero or close to zero; consequently, the entire input voltage must be dropped across the collector-emitter path, a condition capable of destroying the regulating element. Similarly, with a large increase in the input voltage, a sufficiently large fraction of this input voltage is dropped across the series element to damage or destroy it. Similarly, a severe overload condition causes the regulating loop to attempt to correct, establishing an excessive voltage drop across the series regulating elements. Any one of these conditions can result in damage or actual destruction of the series elements. Since the series transistor in the regulator network carries all of the load current, this transistor is a power transistor. Thus, these abnormal conditions result in the damage or destruction of the most expensive element in the regulator. However, besides the economic loss involved in destroying a relatively expensive transistor, a more serious drawback is attendant disabling of the power supply, and the electrical equipment being operated from that power supply.

It is, therefore, the primary objective of this invention to provide a series regulator which is protected against damage or destruction due to over-voltage, overload, or load short-circuit conditions.

Another objective of this invention is to provide a series regulator arrangement which includes a network for disabling the regulator whenever the voltage across the series regulator exceeds a safe value.

Yet another objective of this invention is to provide a series regulator which may be temporarily disabled in the event of over-voltage, overload, or short-circuit conditions, and which is automatically restored whenever these conditions are no longer present.

Other objectives and advantages of the instant invention will become apparent as the description thereof proceeds.

The various advantages of the invention are accomplished, in one form thereof, by providing a regulator which includes a means for sampling the voltage developed across the emitter-collector path of the series regulating transistor. This voltage is utilized to actuate a switching transistor whenever the sampled voltage exceeds a predetermined level. The switching transistor is utilized to bias the series regulating transistor into the non-conducting state, thereby disabling the regulator circuit whenever one of the above-mentioned conditions occurs with sufficient severity to establish an excessive voltage drop across the collector-emitter path of the series-regulating element. The regulator remains in the disabled state until the abnormal condition disappears, at which time a restoring network renders the disabling circuit inoperative, and the regulator is permitted to function in its normal manner.

The various features of the invention, which are believed to be new and novel, are set forth with particularity in the appended claims. The invention, itself, however, may best be understood by reference to the following description, when taken in conjunction with the accompanying drawing, in which:

The sole figure is a schematic illustration of a voltage regulator incorporating the novel disabling circuitry.

The series voltage regulator illustrated in the drawing includes input terminals 11 and 12 connected to an unregulated DC voltage source and output terminals 13 and 14 across which a load is connected. A regulator, shown generally at 16, maintains the voltage at the output terminals 13 and 14 and, hence, across the load, constant in spite of fluctuation in the input voltage or load circuit changes. Regulator 16 includes a PNP transistor 17, having a base 18, a collector 19, and an emitter 20. The emitter-collector path of transistor 17 is connected between input terminal 11 and output terminal 13, through protective diode 21. As pointed out previously, the conductivity of the series regulator is selectively controlled in response to any changes in the regulated output to maintain that output substantially constant.

To this end, an NPN sensing transistor 22 is coupled to the output terminals and produces a control signal which varies with fluctuations of the output voltage. This control signal is utilized, in a manner presently to be described, to bias the series regulating transistor to maintain the output voltage constant. Transistor 22 includes a base 23, connected through a movable slider to a potentiometer 24, which is connected between output terminal 13, and emitter 25 of the transistor. A voltage reference element 26, shown as a Zener diode 26, is connected between the emitter and input-output terminals 12 and 14, and provides a constant reference voltage for the sensing transistor, against which the variation at the output terminals are compared. It will be apparent that the voltage at emitter 25 is constant so that any variation in the output voltage, as reflected by voltage variations at the slider of potentiometer 24, produces a corresponding variation of the base emitter voltage of sensing transistor 22 and a change in the collector current.

The output from sensing transistor 22 is utilized to vary the output from bias control transistor 29 which has its collector emitter path connected between the positive input terminal 11 and a resistor 30 connected between base 18 of the series regulating transistor and the negative input terminal 12. Bias control transistor 29 has its collector 31 connected to the upper end of the base-resistor 30 and its emitter 32 connected directly to the positive input terminal 11. The control signal from the sensing transistor varies the base drive of transistor 29, and hence its collector current. The collector current from bias control transistor 29 flows through resistor 30 connected to the base of transistor 17, thereby varying the base-emitter voltage of the series regulating transistor and biasing the transistor in such a manner as to maintain the output voltage constant. A temperature-stabilizing resistor 33 is connected between the base and emitter of bias control transistor 29.

Thus far, the combination of series regulating transistor 17, sensing transistor 22, and bias control transistor 29 form a perfectly conventional solid-state series regulating network for providing a constant output voltage from an unregulated fluctuating input voltage. However, as pointed out previously, such a regulator is susceptible to series damage or destruction in the event of a large increase in the unregulated input voltage, or a serious overload condition or a short-circuit in the output. In each of these instances, the regulator will attempt to correct by increasing the voltage drop across the collector-emitter path of the series regulating transistor to the extent that the voltage drop and the collector current may exceed the rated collector-to-emitter voltage and the rated collector current for the transistor. This is capable of destroying the transistor, or at least seriously damaging it. In addition, it disables the equipment containing the regulator permanently, or at least until the power supply and the regulator have been replaced. In order to protect the series regulator and its associated equipment, a disabling network is provided which includes a protective switching transistor, which is switched into conduction whenever the voltage across the series transistor exceeds a predetermined maximum level. The switching transistor, when driven into the conducting state, drives bias control transistor 29 in a direction to bias the series regulating transistor into the non-conducting state, thereby disabling the regulator until the abnormal condition disappears.

The protective switching transistor is controlled by continuously sampling the voltage drop across the series regulating transistor. As long as the voltage drop across this transistor does not exceed the predetermined value, the sampled voltage is insufficient to switch the protective transistor into conduction, and the regulator operates in its normal mode. Whenever the voltage exceeds the predetermined level, the sample voltage is of sufficient magnitude and of the proper polarity to switch the protective transistor into the conducting state, producing a large enough current to drive bias control transistor 29 into a heavily conducting state. Whenever bias control transistor 29 conducts heavily or is driven into saturation, the flow of current through base resistor 30 produces a voltage drop across this resistor which drives the base of transistor sufficiently positive to reverse-bias the base-emitter junction, and the tranistor is cut off.

The regulator disabling network includes a protective switching transistor, such as the NPN transistor 34, having an emitter 35 connected directly to the output terminal 13, and a collector 36 connected through a collector resistor to base 28 of the bias-control transistor 29 and through base emitter-resistor 33 to positive supply terminal 11. Base 37 of the switching transistor is connected to a sampling network which senses the magnitude of the voltage drop across the series regulating transistor. The sampling network includes a potentiometer resistor 38, connected across the emitter-collector path of the series-regulating transistor, and a movable slider 39, positioned to establish the voltage level across the series regulating transistor, which will actuate the switching transistor. A restoring network comprising capacitors 40 and 41 is connected between the emitter of the series regulating transistor and the negative input terminal 12. The base of switching transistor 34 is connected to the junction capacitors 40 and 41, which provide quick restoration of the regulating network whenever the abnormal condition disappears. The sampling potentiometer 38, and the movable slider 39, are normally arranged so that if the voltage drop across the emitter-collector of the series regulating transistor remains below the predetermined critical value, the voltage at the slider is not sufficiently positive to forward-bias the base-emitter junction of switching transistor 34. It will be appreciated that emitter 35 of the switching transistor is connected to the regulated output terminal 13, and is, therefore, less positive than the voltage at the slider 39. However, within the expected operating range, and below the critical value, the voltage at the slider is not sufficiently more positive than the emitter voltage to forward-bias the base-emitter junction. Only if the voltage drop across the emitter-collector exceeds the predetermined value, is the transistor forward-biased in order to disable the regulating network by biasing the series-regulating transistor into the non-conducting state.

In operation, as long as no abnormal condition exists, the regulator operates in its usual and well-known mode. That is, with the unregulated input voltage at terminals 11 and 12 at its nominal value, the output voltage across terminals 13 and 14 is at the predetermined value and the voltage drop across potentiometer 24 is such as to maintain base 23 sufficiently more positive than the emitter to maintain a predetermined current flow through this transistor. This current flow, in turn, controls the conductivity of control transistor 29 to establish a current flow through base resistor 30 of a magnitude such that the series regulating transistor 17 is biased to establish a sufficient voltage drop across the emitter-collector path to maintain the desired regulated voltage across the output terminals 13 and 14. If, for example, the voltage across the output terminals should rise, the base voltage of sensing transistor becomes more positive, since the emitter is maintained at a constant reference level by Zener diode 26. If the voltage at the base of NPN sensing transistor 22 becomes more positive, the transistor is driven harder and the collector current increases. The increased base current for transistor 29 increases the collector current and produces an increased voltage drop across base resistor 30, which drives the base of the series-regulated PNP transistor more positive. As the base of the series regulating transistor becomes more positive, it conducts less and the impedance of the collector-emitter path increases, thereby increasing the voltage drop across the series regulating transistor sufficiently to reduce the output voltage across terminals 13 and 14 to the predetermined value.

Similarly, should the voltage across output terminals 13 and 14 decrease, the base of NPN sensing transistor 22 becomes relatively more negative, reducing the collector current flow and reducing the base drive of PNP bias control transistor 29. This reduces the collector current flowing through the transistor and through base resistor 30 of the series regulating transistor. This drives the base of PNP series regulating transistor 17 relatively more negative, reducing the impedance of collector-emitter path, and hence the voltage across the series regulating element, thereby increasing the voltage across the output terminals 13 and 14 to the predetermined regulated level.

As the output voltage fluctuates due to load conditions or variations in the level of the input voltage, the regulator operates in this manner to maintain the output voltage relatively constant. As long as these variations stay within a predetermined acceptable range, the voltage drop across the collector-emitter path of the series regulating transistor also remains within a predetermined permissible range, and the potential at slider 39 is not sufficiently positive with respect to the potential of the emitter of switching transistor 34 to forward-bias its base-emitter junction, and the protective switching transistor remains in the non-conductive state. Whenever one of the abnormal conditions occurs, and the voltage drop across transistor 17 exceeds a predetermined value due to the regulating action of the circuit, the potential at slider 39 becomes sufficiently positive to forward-bias the base-emitter junction of switching transistor 34. Transistor 34 is driven into the conductive state, and its collector current flows to base 28 of the bias control transistor. The increased base current to bias-control transistor 29 increases the flow of collector current in the bias-control transistor substantially. In fact, by providing a transistor which has a high beta, and transistors having betas of 50 or more are easily available today, the increased current flow through base resistor 30 drives base 18 of PNP transistor 17 sufficiently positive to reverse-bias the base-emitter junction. The series regulating transistor is thus driven into the non-conducting state disabling the regulator and preventing damage to the series regulating transistors. When transistor 17 is driven into the non-conducting state, substantially the entire supply voltage appears across the sampling potentiometer 38, since this potentiometer has a high resistance, in the order of 100,000 ohms or so, which is substantially larger than the resistance of the load connected across the output terminal. Consequently, the voltage at the output terminal goes substantially to zero. It will be noted that the voltage at emitter 35 of switching transistor also goes to zero. However, the voltage at the slider 39 of the potentiometer and, hence, at the base of the switching transistor also goes more positive, as the entire input or supply voltage appears across potentiometer 38, thereby maintaining the transistor in the conducting state, as long as the abnormal condition persists.

Whenever the abnormal condition ceases, the regulator is returned to its operative state through the action of capacitor 40 and the potentiometer sampling arrangement shunting the collector-emitter path. Capacitor 40, which is connected to the positive side of the potentiometer charges up to a voltage which is equal to the difference between the potential at slider 39 and the potential at input terminal 11, with a polarity as illustrated, i.e., with the lower plate negative with respect to the upper plate. With the regulator operating and the voltage drop across potentiometer relatively small, the negative voltage across capacitor 40 is relatively small. During interval that the regulator is disabled, however, the entire supply voltage is dropped across potentiometer 38 and capacitor 40 charges to a much higher voltage level. Whenever the abnormal condition disappears, the potential at slider 39 rapidly returns to its previous value. However, the voltage across capacitor 40 remains at the higher voltage level, since capacitor 40 cannot discharge instantaneously. The discharge path for capacitor 40 is the high resistance of potentiometer 38. Therefore, a relatively negative voltage is instantaneously applied to the base of switching transistor 34, driving the transistor into cut-off and restoring the network into operation.

As quite simple examples of the manner in which capacitor 40 operates to restore the regulating network to operation whenever the abnormal condition disappears, the following simplified numerical examples may be considered without in any way limiting the invention. Assume, for example, that the slider 39 is positioned along potentiometer 38, so that the ratio of resistance between the slider and the left-hand and right-hand ends of the potentiometer (and, hence, the ratio of the voltages) is 19 to 1. Therefore, 1/20th of the voltage across the potentiometer is developed between the slider and the right-hand end. Assume further that the nominal input voltage at the terminals 11 and 12 is 15 volts and the desired regulated output voltage is 10 volts, and the disabling network is to be actuated whenever the input voltage exceeds 20 volts or the output circuit is shorted. Thus, under normal operating conditions, the voltage drop across the emitter-collector path and, hence, across the potentiometer 38, is 5 volts. With the given resistance-ratio values, slider 39 is 0.25 volt more positive than its right-hand end. Emitter 35 of switching transistor 34 is at +10 volts, since it is connected to output terminal 13, and the voltage at the base of the transistor is at +10.25 volts. If the base-to-emitter voltage required to forward bias the particular transistor is 0.5 volt, it can be seen that the base-emitter junction is reverse-biased and transistor 34 is in a non-conducting state. It will also be appreciated that capacitor 40, which is connected to the input terminal will charge up to a voltage equal to the difference between the input voltage at the left-hand end of the potentiometer, i.e., +15 volts, and the voltage at the slider, i.e., 10.25 volts and, therefore, a negative voltage of —4.75 volts exists across the capacitor.

If the input voltage now increases to 20 volts (which is the critical level), the regulator attempts to regulate to 10 volts, and varies the conductivity of the series-regulating element to produce a 10-volt drop across the collector-emitter. The voltage drop across potentiometer 38 is correspondingly increased to 10 volts. The voltage at the potentiometer slider 39 increases to 10.5 volts (+.5 volt at the slider, plus the +10 volts at the regulator output terminal). The base of transistor 34 is now 0.5 volt more positive than the emitter, and the junction is forward-biased, switching transistor 34 conducts, and in the manner previously described, biases series regulating transistor 17 into the non-conducting state. With transistor 17 in the non-conducting state, the voltage at the output terminals goes to zero, and substantially the entire supply voltage is now dissipated across potentiometer resistor 38, since, as pointed out previously, it is substantially larger than the load resistance. The voltage at potentiometer slider 39 now drops from +10.5 volts to +1 volt (1/20th of the 20 volts). However, since the voltage at the output terminal 13 has gone to zero, emitter 35 of switching transistor also goes to zero, so that the base-emitter junction is still forward-biased and keeps the transistor in the conducting state. Since slider 39 has dropped from +10.5 volts to +1 volt, the remaining voltage, 19 volts, is dropped between the slider and the left-hand end of the potentiometer. Capacitor 40 must now charge to the difference between the input voltage and the voltage at the slider, i.e., the capacitor charges from —4.5 volts to —19 volts. At some time later, the abnormal excessive input voltage condition disappears and the input voltage is reduced from 20 volts to 15 volts. The entire 15 volts is still dropped across potentiometer 38, since transistor 34 is still conducting and transistor 17 is cut off. However, capacitor 40 has previously been charged to a voltage which is 19 volts negative with respect to the input voltage terminal, cannot discharge instantaneously. Since the input voltage is now +15 volts, but the voltage across the capacitor is 19 volts more negative than the input terminal, a negative voltage of approximately 4 volts is applied to the base of switching transistor 34 by the capacitor 40, which rapidly and effectively reverse-biases the switching transistor and drives it into the non-conducting state. This, of course, enables bias control transistor 29, and sensing transistor 22, and series regulating transistor 17 is biased back into a conducting state, thereby restoring operation of the regulating network upon disappearance of the abnormal input voltage condition.

Similarly, in the event that a load short-circuit occurs, the voltage at the output terminal goes to zero because of the short-circuit and the entire voltage is dropped across potentiometer 38. The voltage at emitter 35 of the switching transistor is at zero, but the voltage at slider 39 is now sufficiently positive to drive switching transistor 34 into conduction to disable the regulator by biasing the series regulating transistor into the non-conducting state. When the short-circuit condition disappears, the voltage at output terminal 13 rises from zero to a value determined by the ratio of the load resistance to the resistance of the potentiometer. In any event, however, the voltage at terminal 13 goes positive by some amount. Emitter 35 of the protective switching transistor, therefore, goes from zero volts to some positive voltage. The potential at slider 39 also rises in the positive direction. However, the negative voltage on capacitor 40 maintains the base of the transistor at the previous level, since the capacitor cannot discharge instantaneously through the high resistance of potentiometer 38. With the voltage at the base being temporarily clamped by the capacitor and the emitter voltage going more positive, the base-emitter voltage of the NPN transistor goes sufficiently negative to reverse-bias the base-emitter junction, driving the transistor into cut-off and restoring normal operation of the regulator network.

It will be appreciated from the above discussion that a simple, effective regulating network has been devised, which incorporates a disabling arrangement for the regulator in the event that abnormal input and output conditions occur, which are capable of damaging or destroying the expensive series regulating power transistor. The regulator contains a further network for restoring operation of the regulator whenever the abnormal condition which has actuated the disabling network disappears.

While a particular embodiment of the invention has been described and shown, it will be understood that it is not limited thereto, since many modifications and variations in the circuit arrangement for carrying out the invention may be made. It is contemplated that the appended claims cover any such modifications as fall within the true spirit and scope of the invention.

What is claimed as new and desired to be secured by Letters Patent is:

1. In a series voltage regulator having a pair of input terminals for connection to a source of unregulated voltage and a pair of output terminals having a regulated output voltage appearing thereacross, the combination comprising,
    (a) a regulating transistor having its emitter-collector path connected in series between one of the input terminals and one of the output terminals,
    (b) a sensing transistor coupled to said output terminals, the output of said sensing transistor varying about a predetermined value as the output regulated voltage varies from a predetermined value,
    (c) means coupling the signal from said sensing transistor to said series-regulating transistor to vary the biasing thereof to vary the impedance of and the voltage drop across the collector-emitter path in response to the output voltage variations in a direction and by an amount sufficient to return the output voltage to the predetermined value,
    (d) protective means including a normally cutoff switching transistor, means for sensing the voltage drop across the emitter-collector path of said series transistor to drive said switching transistor into conduction and develop a control signal whenever the voltage drop exceeds a predetermined permissible level in response to abnormal input or output conditions,
    (e) means to apply said control signal to said regulating transistor to bias it into cut off to protect said regulating transistor during any such abnormal conditions and to restore it to conduction when the abnormal condition ceases, and
    (f) restoring means in said protective network for rapidly cutting off said switching transistor when the abnormal input or output condition and the excessive voltage drop across the series regulating transistor disappears.

2. The series regulator according to claim 1 wherein said protective means includes a voltage-divider means across said regulating transistor to sense the voltage drop across the said emitter-collector path, and means to couple said voltage divider to said switching transistor, and said restoring means comprises a capacitor coupled between one end of said voltage divider and said switching transistor, wherein said capacitor charges to a voltage of a proper polarity to drive said switching transistor into the non-conducting state whenever the abnormal conditions disappear.

References Cited

UNITED STATES PATENTS

| | | | |
|---|---|---|---|
| 3,074,006 | 1/1963 | Klees | 323—9 |
| 3,100,863 | 8/1963 | McCullough. | |
| 3,201,606 | 8/1965 | Mamon. | |
| 3,305,764 | 2/1967 | Todd | 323—9 |
| 3,335,361 | 8/1967 | Natale et al. | |

JOHN F. COUCH, *Primary Examiner.*

WARREN E. RAY, *Examiner.*

A. D. PELLINEN, *Assistant Examiner.*